Patented Sept. 12, 1939

2,172,629

UNITED STATES PATENT OFFICE 2,172,629

FLOORING COMPOSITION AND METHOD OF APPLYING THE SAME

William C. Treuhaft, Mentor-on-the-Lake, Ohio, assignor to The Tremco Manufacturing Company, Cleveland, Ohio, a corporation of Ohio No Drawing. Application May 20, 1936, Serial No. 80,808

3 Claims. (Cl. 94—3)

This invention relates to a composition of matter for flooring, and to a method of applying it to a suitable foundation material to produce an improved terrazzo flooring.

In producing flooring of the terrazzo type, it has heretofore been the practice to first lay a heavy foundation material of Portland cement and to then apply thereto a layer of Portland cement containing an aggregate, such as marble chips, to provide a terrazzo finish. Flooring produced in such a manner, however, has substantially no resiliency, is comparatively heavy, and the level is raised to a considerable extent. Moreover, as heretofore prepared, it has been impractical to utilize floors of the terrazzo type in remodeling and reconstructing old floors because the raising of the floor level necessitates the reconstruction or the moving of fixtures, such as counters, shelving and the like. Furthermore, the increase in weight of the flooring often makes it necessary to shore up or reinforce the flooring which greatly increases the cost of the remodeling work.

Floors in which a bituminous material, such as emulsified asphalt, is utilized have also been applied and while such floors have been highly satisfactory for use in industrial plants, they are not attractive, with the result that they are unsatisfactory for use in offices, homes or commercial establishments where floors having a pleasing appearance are desirable.

By the present invention, I have provided an improved flooring that is comparatively light in weight and which may be applied in thin layers to various types of foundations to produce a terrazzo effect which is highly attractive in appearance. My improved flooring may therefore be utilized in homes, offices or commercial establishments where beauty, distinctiveness of design, durability and low cost are important factors.

It is therefore an object of my invention to provide for flooring an improved composition, that is light in weight and which may be applied as a thin layer to various types of foundations to produce an attractive flooring having a high degree of durability.

Another object of my invention is to provide for flooring an improved composition containing a bituminous material, such as emulsified asphalt, which may be applied as a flooring in homes, offices or commercial establishments, and which is durable and attractive.

A further object of my invention is to provide an improved flooring having a terrazzo finish and an improved method of applying it in a comparatively thin layer to a suitable foundation.

A still further object of my invention is to provide a process of applying a thin layer of an improved flooring composition to foundation material to provide an attractive structure having resiliency and durability.

In practicing my invention, an improved flooring composition is prepared consisting of a bituminous material such as emulsified asphalt, a hydraulic cement such as Portland cement, and a suitable aggregate, such as marble chips, limestone or other colored stones having a decorative appearance. The bituminous material may be emulsified with water containing a colloidal clay, soap or other chemical agent. In place of emulsified asphalt, other emulsified bituminous material such as tar, ozocerite, manjak or elaterite may be employed. In preparing the composition, the hydraulic cement is mixed with the aggregate and sufficient water is added to form a uniform mortar of average consistency. The emulsified bituminous material is then added and serves as a binding agent.

The following specific example will serve to illustrate and explain my invention. One part of Portland cement was mixed with approximately six parts of marble chips to which sufficient water was added to form a uniform mortar of average consistency. Approximately two parts of emulsified asphalt were then added to form my improved flooring composition. In such composition, the Portland cement acts as a dehydrating agent and serves to give the floor an initial hardness during the setting of the material and the emulsified asphalt not only serves to bind the aggregate particles together but also, serves to bind such composition to the foundation material.

Although specific proportions have been given in the foregoing example, it will be understood that I do not desire to limit myself in that respect as obviously the proportions may be varied within comparatively wide limits.

The emulsified asphalt should preferably be in excess of the cement because emulsified asphalt has less specific gravity and is more resilient than Portland cement. It also has a dark color which provides a pleasing background for the aggregate. The amount of aggregate that is present may also be varied in accordance with the desired design. As the aggregate, I prefer to use marble chips which are obtainable in a large variety of colors, such as white, ivory, yellow, green or blue.

My improved flooring composition may be applied to any suitable foundation material, such as wooden or cement surfaces and the like, although for purposes of illustration, it will be described as applied to a cement floor. Before applying the flooring composition, the surface of the cement floor is first cleaned and emulsified asphalt is applied as a priming coat, any holes or depressions in such surface preferably being filled with a mixture consisting of approximately one part cement, one part sand, three parts gravel and one part emulsified asphalt. The mixture utilized to fill holes or depressions and the priming coat are then permitted to dry, after which another priming coat is applied and permitted to dry.

A composition consisting of approximately one part hydraulic cement and six parts of aggregate and sufficient water to form a substantially uniform mortar of average consistency is then prepared, after which approximately two parts of emulsified asphalt are added. The resulting mastic composition is applied and raked to the desired level, the final level being obtained by striking-off boards. I have found that a layer having a thickness of approximately one-half inch is suitable, although obviously the thickness may be varied. The mastic composition is then allowed to stand until it can be floated with an ordinary power float or by hand. The floating of the composition not only provides a level surface but also brings the white or colored aggregate to the surface. The mastic composition can also be rolled by means of an ordinary roller such as is used in terrazzo work, so as to compact such composition and orient the aggregate into proper position for grinding. The flooring, as thus applied, is allowed to set and is then thoroughly wetted with water and ground while wet, either with or without the addition of sand. An ordinary terrazzo grinding machine provided with a suitable carborundum stone may be employed for this purpose. A grouting of cement and a bituminous material such as emulsified asphalt in approximately the proportions of one part emulsified asphalt and two parts cement is mixed with sufficient water to form a thick paste and the paste is troweled thoroughly into all the voids and allowed to dry. Any slight depressions occurring in the floor may then be ground while wet with a smaller grinding machine. By utilizing grinding machines of different sizes, the maximum amount of aggregate and the minimum amount of matrix may be exposed without grinding the slightly elevated portions to such an extent that the aggregate particles will become loosened or dislodged.

Another method which I employ in applying my flooring is to prepare a composition consisting of approximately one part hydraulic cement, six parts of aggregate such as limestone or inexpensive marble chips, and sufficient water to make a substantially uniform mortar of the desired consistency, after which approximately two parts of emulsified asphalt are added. The resulting mastic composition is applied and raked to the desired level, the final level being obtained by striking-off boards. I have found that a layer having a thickness of approximately one-half inch is suitable, although obviously the thickness may be varied. The mastic composition is then allowed to stand until the excess water has evaporated and the cement has attained an initial hardness. Marble chips of the desired size and color are then spread on the prepared surface at a predetermined rate and the mastic composition is rolled by means of a heavy hand roller to force the marble chips into the surface and orient the aggregate into proper position for grind. The floor as thus applied is allowed to set, drying being retarded by means of a suitable covering, such as building paper. After the composition has thoroughly set, the surface is ground with an ordinary terrazzo grinding machine while wet, utilizing a suitable carborundum stone. A grouting of cement and a bituminous material, such as emulsified asphalt, in approximately the proportions utilized in the original composition is mixed with sufficient water to form a thick paste and the paste is troweled thoroughly into all the voids. Any slight depressions may then be ground with a smaller machine as in the previous example.

In this method, it will be apparent that by spreading the comparatively expensive marble chips over the surface of the partially set composition and rolling or forcing them into the composition, a floor will be produced, after grinding, in which the exposed surface displays a maximum amount of the rich appearing marble chips and a minimum amount of matrix. By utilizing different size grinding machines, it will be apparent that the slightly elevated portions may be ground to the desired depth by utilizing a grinding machine of a comparatively large size and the slightly depressed area between the elevated portions may be ground with a machine of a smaller size without exerting a further grinding action upon the previously ground elevated portions. The danger of chips in the slightly elevated portion being loosened or dislodged, which often occurs when the entire surface is ground at one time, is therefore avoided.

It will be noted that the floor produced by the second method is similar to that produced by the first method with the exception that the aggregate utilized in the body of the mixture may be formed principally of inexpensive material such as limestone or a cheaper grade of marble chips while the more expensive marble chips exposed at the surface enhance the beauty of the floor and give it a rich appearance.

After the grouting has set for twenty-four hours or more the flooring while wet may be again ground with the terrazzo machine, using a finer carborundum stone so as to provide as smooth a surface finish as possible, and, if desired, grinding machines of different sizes may be utilized in this operation. A suitable coating, such as hard wax, varnish or the like may then be applied, the purpose of the varnish, wax or the like being to provide a smoother surface. The coating also accentuates the color of the aggregate and thus gives the flooring a more attractive appearance.

From the foregoing description, it will be apparent that I have provided an improved flooring that has durability, resiliency, light weight and which may be produced at low cost. By employing marble chips of various colors and by utilizing brass strips between sections of the flooring, a great variety of color designs is available. The dark background produced by the emulsified asphalt sets off the colored marble chips and the flooring has a highly decorative surface.

In view of the light weight of my improved flooring as compared to that of ordinary terrazzo flooring in which cement alone is utilized as the binding agent, such flooring is particularly adapted to be utilized for resurfacing wooden floors, as under ordinary circumstances, no additional reinforcement for such wooden floors is required. Since emulsified asphalt possesses durability and has high binding properties, a layer approximating about one-half inch is all that is required. It is therefore apparent that in remodeling commercial establishments, it will not be necessary to change or move fixtures, such as counters, shelving or the like.

My improved flooring is also superior to ordinary terrazzo floors in that it possesses resiliency and has sufficient frictional properties to prevent slipping. It is non-porous, may be readily cleaned, and light falling upon its surface is softly diffused or absorbed.

By utilizing grinding machines of various sizes, it will also be apparent that a maximum amount of the aggregate and a minimum amount of the matrix will be exposed without danger of causing the aggregate chips to be loosened or dislodged.

To those skilled in the art, many modifications of and widely different embodiments and applications of my invention will suggest themselves without departing from the spirit and scope thereof. My disclosure and the description herein are purely illustrative, and are not intended to be limiting in any sense.

What I claim is:

1. The method of preparing a flooring having a terrazzo effect, which comprises mixing a minor portion of a hydraulic cement with a major portion of ornamental chips to form a uniform mortar of average consistency, mixing emulsified asphalt with the mortar in an amount substantially in excess of the hydraulic cement, applying the composition to a foundation, levelling the composition, allowing the composition to stand until it can be floated and then floating the composition to bring a portion of the ornamental chips to the surface.

2. The method of preparing a flooring having a terrazzo effect, which comprises mixing approximately one part of hydraulic cement with approximately six parts of ornamental chips and sufficient water to form a mortar of average consistency, mixing approximately two parts of emulsified asphalt with the mortar, applying the composition to a foundation, levelling the composition, allowing the composition to stand until it can be floated, and then floating the composition to bring a portion of the ornamental chips to the surface.

3. An improved terrazzo flooring comprising bituminous material, ornamental chips and a hydraulic cement, said bituminous material being present in an amount substantially in excess of the hydraulic cement and in sufficient proportion to bind the chips together and being in an emulsified state when the flooring is applied, and said hydraulic cement being interspersed throughout the bituminous material and being effective in causing a dehydration of the bituminous material and in effecting an initial hardness of the flooring during the setting thereof, and a portion of said chips being visible at the upper surface to form an ornamental appearance.

WILLIAM C. TREUHAFT.